United States Patent [19]
Wrobleski

[11] Patent Number: 6,018,374
[45] Date of Patent: Jan. 25, 2000

[54] METHOD AND SYSTEM FOR PREVENTING THE OFF SCREEN COPYING OF A VIDEO OR FILM PRESENTATION

[75] Inventor: William J. Wrobleski, Sunnyvale, Calif.

[73] Assignee: Macrovision Corporation, Sunnyvale, Calif.

[21] Appl. No.: 08/882,675

[22] Filed: Jun. 25, 1997

Related U.S. Application Data

[60] Provisional application No. 60/015,989, Jun. 25, 1996.

[51] Int. Cl.$^7$ ........................................................ H04N 5/74
[52] U.S. Cl. .............................. 348/744; 348/750; 353/30
[58] Field of Search ..................... 380/54, 7, 5; 348/164, 348/744, 750, 751, 776, 778, 779; 352/39, 131, 133, 244; 353/30, 48, 94, 36; H04N 5/74

*Primary Examiner*—David E. Harvey
*Attorney, Agent, or Firm*—Gerow D. Brill

[57] ABSTRACT

A method and system for preventing a visible video copy being made of a projected image on a screen. In a theater environment, an image is projected upon a screen by a film projector or a video projector. A form of film piracy is accomplished by copying the image on the screen with a video camcorder. Most of these video camcorders are sensitive to the visual spectrum as well as portions of the infra red spectrum. To prevent the copying of a projected image by such a video camcorder, a focused or unfocused image in the infra red spectrum is projected on top of the visual image. This infra red image will not be visible to the audience in the theater. However a recording of the visual image by a video camcorder sensitive to the infra red spectrum will be distorted beyond use.

When a focused infra red image is projected onto the screen it may include a message indicating the date and source of the recording. Other messages could be used including a message to the video pirate that he has been caught.

6 Claims, 1 Drawing Sheet

METHOD AND SYSTEM FOR PREVENTING THE OFF SCREEN COPYING OF A VIDEO OR FILM PRESENTATION

This application claims benefit of provisional application Ser. No. 60/015,989 filed Jun. 25, 1996.

CROSS REFERENCE TO RELATED APPLICATION

This application is related to copending application Ser. No. 08/294,983, filed Aug. 24, 1994 entitled Video Finger Print Method and Apparatus by Gregory Copeland.

BACKGROUND OF THE INVENTION

1. Field of the Invention

This invention relates to preventing the off screen copying by a video camera/recorder (camcorder) of a video or film presentation.

2. Description of Related Art

Commonly assigned application Ser. No. 08/294,983 filed by Gregory Copeland on Aug. 24, 1994 by Gregory Copeland (incorporated herein by reference) discloses a method and apparatus for injection of data (Finger Print) into the active picture area without disturbing the viewing of the video signal and the retrieval of the data by a data reader, a Fingerprint Reader.

DESCRIPTION OF THE PROBLEM TO BE SOLVED

With video piracy becoming more rampant by the day, it is becoming more desirable to have a method of discouraging unauthorized copying and identifying video recordings the source of such unauthorized recordings.

Source or tape identification processes using the data transmission capability of the vertical interval have been known to those skilled in the art. However, such systems suffer from the ease of eliminating the source identification data by blanking or reinsertion techniques. The Copeland application discloses a method and apparatus for putting the data in the active picture area is such a way that makes removal difficult. Detection is however, relatively easy.

One form of video piracy prevalent today is the use of a video camera to record the picture material off the screen and the sound of the speakers. Admittedly this method produces an inferior copy. However, in certain parts of the world, generally outside of the United States, such a copy is acceptable. The use of video movie projection systems in theaters is becoming more popular. Generally, these systems incorporate a form of video scrambling to protect the electronic video signals prior to projection. However, vertical interval source identification and video scrambling do not protect the projected image once the signal has been descrambled and projected.

The video fingerprint system described above provides only an identification of where the unauthorized copy was made. It does not produce an inferior copy.

The need is for a system that produces an inferior copy as means of discouraging the video piracy. Additionally, source identification not depending on finger print readers makes the anti-piracy efforts less expensive.

SUMMARY OF THE INVENTION

In accordance with a first embodiment, the invention comprises a method of preventing a visible video copy being made of a projected image on a screen. In a theater environment, an image is projected upon a screen by a film projector or a video projector. A form of film piracy is accomplished by copying the image on the screen with a video camcorder. Most of these video camcorders are sensitive to the visual spectrum as well as portions of the infra red spectrum. To prevent the copying of a projected image by such a video camcorder, a focused or unfocused image in the infra red spectrum is projected on top of the visual image. This infra red image will not be visible to the audience in the theater. However a recording of the visual image by a video camcorder sensitive to the infra red spectrum will be distorted beyond use.

A second embodiment of the invention is to project a focused infra red image onto the screen with a message indicating the date and source of the recording. Other messages could be used including a message to the video pirate that he has been caught.

These and other aspects, features and advantages of the invention will become apparent upon review of the succeeding description taken in connection with the accompanying drawings. The invention is pointed with particularity by the appended claims.

DETAILED DESCRIPTION OF THE INVENTION

Figure 1:
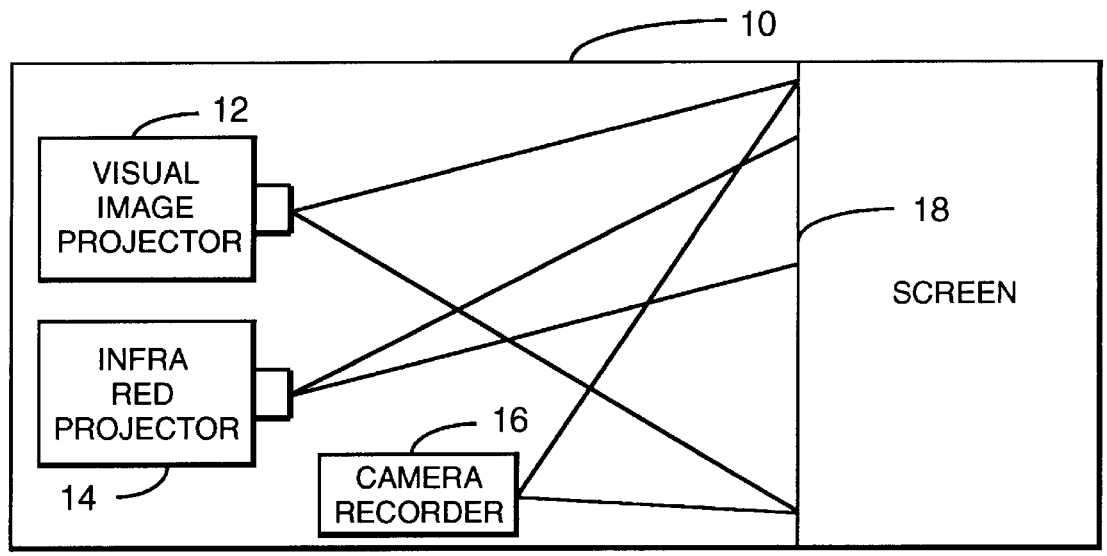
FIG. 1 shows a theater arrangement according to a embodiment of the invention.
Figure 2:
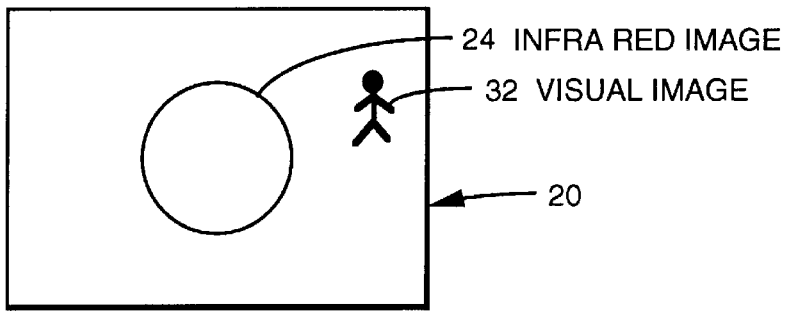
FIG. 2 shows a screen with a visual image and an unfocused infra red overlay.

The invention herein described comprises a method of preventing a useful video copy being made of an image projected onto a screen. FIG. 1 illustrates the elements needed. In a theater 10, an image is projected upon a screen 18 by a visual image projector 12, e.g., film projector or a video projector. Film piracy is accomplished by copying the image on the screen with a video camcorder 14. Most of these video camcorders are sensitive to the visual spectrum as well as portions of the infra red spectrum. To prevent the copying of the projected visual image 18 video camcorder 14, a focused or unfocused image in the infra red spectrum is projected on top of the visual image by infra red projector 14. This infra red image will not be visible to the audience in the theater. However a recording of the visual image by a video camcorder sensitive to the infra red spectrum will be distorted beyond use. FIG. 2 shows the projected image 20 on the screen 18 comprises the visual image 22 and the infra red portion 24.

Figure 3:
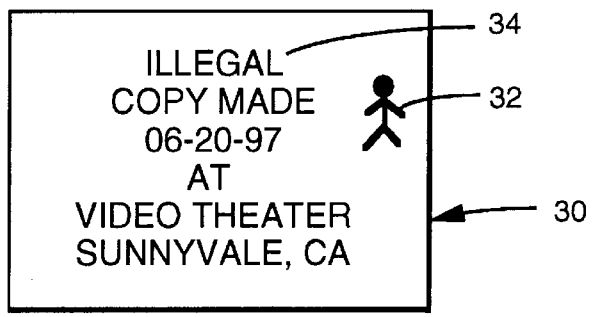
FIG. 3 shows a screen with a visual image and a focused infra red overlay with a message.

A second embodiment of the invention is to project a focused infra red image onto the screen with a message. This message may include the date and source of the recording. FIG. 3 shows a projected image 30 comprising a visual image 32 and the focused infra red image with a message 34. Other messages could be used including a message to the video pirate that he has been caught.

Experimental testing of the method has shown that the visual image is distorted beyond use by a video camera, but the visual image is not disturbed for the visual viewing by humans.

The effect of such a system is to produce illegal copies that are of no use to the video pirate.

The above description of the invention is illustrative and not limiting; further modifications will be apparent to one of ordinary skill in the art in the light of this disclosure and the appended claims.

I claim:

1. A method of preventing a visible video copy being made of a projected image on a screen comprising the steps of:

projecting a visual image on to a screen;

projecting an infra-red signal on to at least one portion of said screen;

recording said visual image and said infra signal reflected from said screen, wherein said recording device is sensitive to both said visual image and said infra red light signal thus making a degraded recording of said visual image while said infra signal is not perceived by human observers of said screen.

2. A method of claim 1, wherein said infra-red signal is unfocused on to a the screen thus making a degraded recording of said visual image.

3. A method of claim 1, wherein said infra-red signal is focused on to the screen and includes a message indicating the date and source of the recording.

4. A system for preventing a usable video copy being made of a projected visual image on a screen comprising:

a first projector, projecting a visual image on a screen;

a second projector, projecting an infra red light signal on to at least one portion of said screen; and a recording device, sensitive to both the, infra red and visual light spectrum, wherein said infra red signal and said visual image are reflected from said screen and said infra red light signal obscures said reflected visual in said recording device while said infra red signal is not perceived by the human observers of said screen.

5. A system of claim 4, wherein said infra-red signal is unfocused on to a the screen thus making a degraded recording of said visual image.

6. A system of claim 4, wherein said infra-red signal is focused on to the screen and includes a message indicating the date and source of the recording.

* * * * *